(12) United States Patent
Howard (10) Patent No.: US 9,103,475 B2
(45) Date of Patent: Aug. 11, 2015

(54) SWIVEL MISALIGNMENT COUPLING FOR CONNECTING CONDUIT SECTIONS

(71) Applicant: Taper-Lok Corporation, Houston, TX (US)

(72) Inventor: Erik M. Howard, Baytown, TX (US)

(73) Assignee: Taper-Lok Corporation, Houston, TX (US)

( * ) Notice: Subject to any disclaimer, the term of this patent is extended or adjusted under 35 U.S.C. 154(b) by 0 days.

(21) Appl. No.: 14/297,383

(22) Filed: Jun. 5, 2014

(65) Prior Publication Data

US 2014/0300102 A1 Oct. 9, 2014

Related U.S. Application Data

(63) Continuation of application No. 12/392,431, filed on Feb. 25, 2009, now abandoned.

(51) Int. Cl.
*F16L 27/00* (2006.01)
*F16L 27/053* (2006.01)
*F16L 27/08* (2006.01)

(52) U.S. Cl.
CPC ........... *F16L 27/053* (2013.01); *F16L 27/0812* (2013.01); *F16L 27/0861* (2013.01)

(58) Field of Classification Search
CPC ..... F16L 23/032; F16L 23/024; F16L 23/028; F16L 23/0283
USPC ............... 285/263, 272, 332.1, 414
See application file for complete search history.

(56) References Cited

U.S. PATENT DOCUMENTS

2004/0046391 A1 * 3/2004 Vasudeva .................. 285/368

\* cited by examiner

*Primary Examiner* — Michael P Ferguson
*Assistant Examiner* — Gwendolyn Driggers
(74) *Attorney, Agent, or Firm* — Law Offices of Mark L. Berrier (57) ABSTRACT

A swivel misalignment coupling for connecting pipe sections in a high-pressure conduit. In one embodiment, the coupling is a three-bolt coupling having a female coupling member, a male coupling member, and a swiveling collar member. The male and female coupling members have contact surfaces that are spherical to enable sealing contact between them. A seal ring may be positioned between the contact surfaces to ensure a good seal. The collar swivels around the male coupling member to facilitate fastening of the collar to the female coupling member, which holds the male and female coupling members in sealing engagement. Recesses may be positioned radially inward from the attachment points (e.g., bolt holes) of the female coupling member to reduce stress and potential deformation of the contact surface.

18 Claims, 6 Drawing Sheets

SWIVEL MISALIGNMENT COUPLING FOR CONNECTING CONDUIT SECTIONS

CROSS-REFERENCE TO RELATED APPLICATIONS

This application is a continuation of U.S. patent application Ser. No. 12/392,431, filed Feb. 25, 2009, which claims the benefit of U.S. Provisional Patent Application 61/122,325, filed Dec. 12, 2008, both of which are incorporated by reference as if set forth herein in their entirety.

BRIEF DESCRIPTION OF THE DRAWINGS

Other objects and advantages of the invention may become apparent upon reading the following detailed description and upon reference to the accompanying drawings.

While the invention is subject to various modifications and alternative forms, specific embodiments thereof are shown by way of example in the drawings and the accompanying detailed description. It should be understood, however, that the drawings and detailed description are not intended to limit the invention to the particular embodiment which is described. This disclosure is instead intended to cover all modifications, equivalents and alternatives falling within the scope of the present invention as defined by the appended claims.

DETAILED DESCRIPTION OF EXEMPLARY EMBODIMENTS

One or more embodiments of the invention are described below. It should be noted that these and any other embodiments described below are exemplary and are intended to be illustrative of the invention rather than limiting.

As described herein, various embodiments of the invention comprise conduit systems and couplings for conduits, wherein the couplings are configured to facilitate easy and reliable connections of potentially misaligned conduit sections.

There are many applications for high-pressure and/or high strength conduits, particularly in the chemical and oil processing industries. The fluids that are conveyed by these conduits may be very hazardous. For instance, the fluids may be corrosive, poisonous, or harmful to the environment. Additionally, the fluids may be carried through the conduits at very high pressures or very high temperatures, making them even more dangerous if the conduits leak.

Various types of couplings have been developed to enable reliable connections to be formed between sections of high strength conduits. Typically, these connections are made by welding heavy flanges to the ends of the conduit sections and then bolting the flanges together with a gasket or seal between them. Often, the flanges are immovable, and a good seal can only be formed between the flanges if the sealing faces of the flanges are properly positioned and precisely aligned. In some applications, however, it is necessary to use many different conduit sections, or to install the conduit sections around other equipment, both of which make it difficult to accurately position or align all of the conduit sections so that good seals between the conduit sections can be ensured.

Misalignment couplings have been developed for some applications. These misalignment couplings are typically used to couple large diameter pipe sections, such as oil pipelines. Conventional misalignment couplings are typically very bulky devices that are secured by bolting together heavy flanges around the peripheries of the couplings' components. Conventional misalignment couplings are therefore normally very large, heavy devices that require a great deal of time and effort to assemble and thereby join the conduit sections. Consequently, these misalignment couplings are not well suited for use in conduit systems that use smaller-diameter (but still high-strength and/or high-pressure) conduits and require assembly of many different conduit sections.

It would therefore be desirable to provide systems and methods for coupling conduit sections together, wherein the couplings between the conduit sections have sufficient strength to provide reliable seals between potentially misaligned sections of conduit in a high-strength and/or high-pressure system, and wherein the couplings are configured to be lightweight and easily assembled.

Figure 1A:
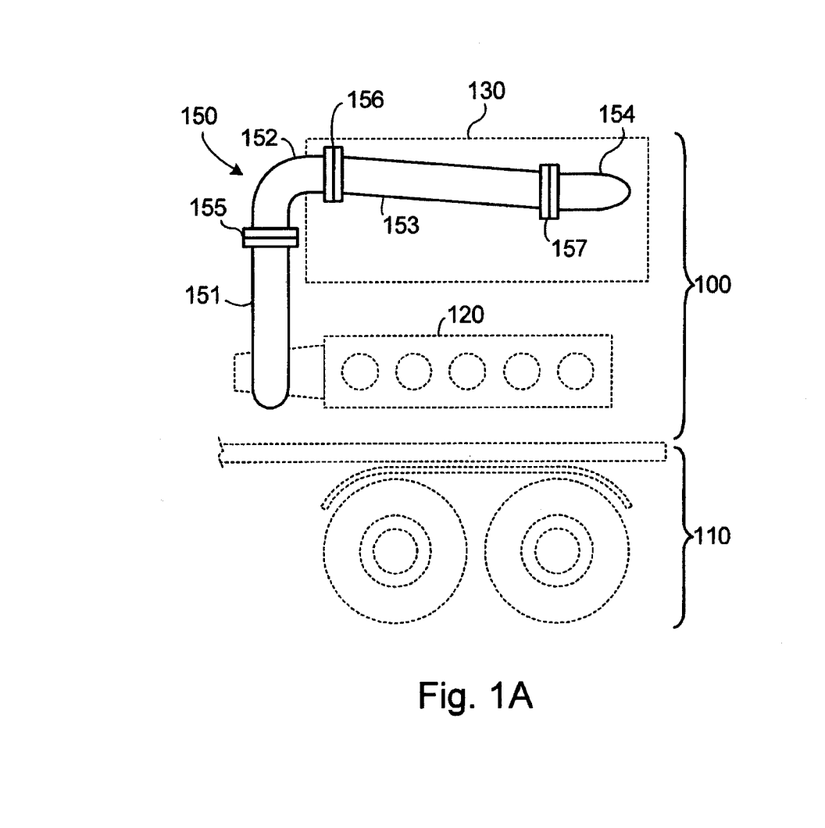
FIGS. 1A and 1B are diagrams illustrating an exemplary implementation of a conduit system in accordance with one embodiment.
Figure 1B:
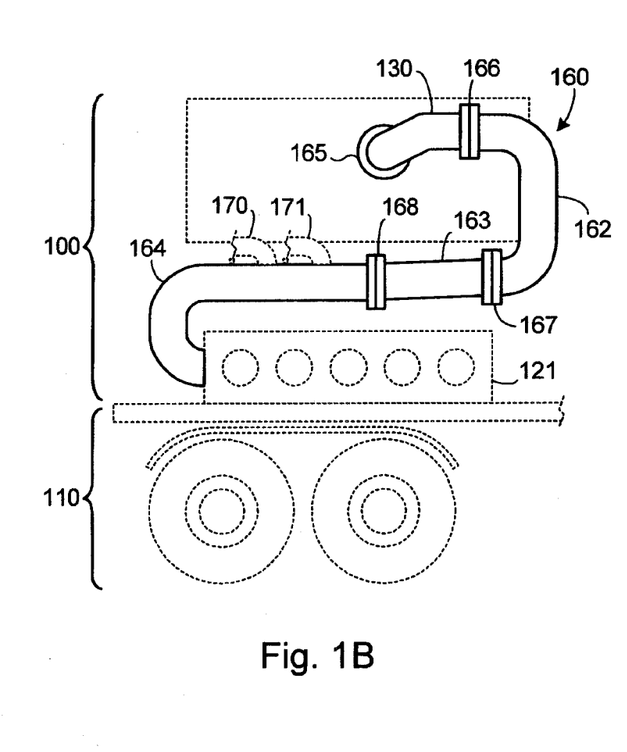

Referring to FIGS. 1A and 1B, an exemplary implementation of a conduit system in accordance with one embodiment is shown. In this embodiment, the conduit system is used to interconnect various components of a truck-mounted fluid processing system. FIG. 1A shows the left side of the system and FIG. 1B shows the right side of the system.

Fluid processing system 100 is mounted on a truck 110 to enable the system to be easily transported. The truck-mounting of the system, however, places several constraints on the design of the system. For instance, because of the limited amount of space on the truck, the system must be designed to be as compact as possible. The components must therefore be placed very close to each other, and the interconnecting conduits must be routed around components that might not otherwise be in the way in a stationary (non-truck-mounted) implementation. Further, the components may not be as precisely positioned when mounted on the truck, so the conduits need to be able to account for potentially greater mis-positioning or misalignment than in a stationary implementation. Still further, the capacity limitations of the truck demand that the interconnecting conduits be as light as possible.

In the embodiment of FIGS. 1A and 1B, two exemplary conduit sections are illustrated—one on the left side of the system and one on the right side of the system. On the left side of the system, conduit 150 connects an input manifold 120 to a main fluid processing component 130. On the right side of the system, conduit 160 connects main fluid processing component 130 to output manifold 121. Because output manifold 120 cannot be precisely positioned with respect to the input of processing component 130, conduit 150 includes multiple conduit sections that are connected by corresponding couplings in order to allow the conduit to be securely connected to form a leak-free conduit. Conduit 150 includes four sections, 151-154. Section 151 is rigidly coupled to input manifold 120, while section 154 is rigidly coupled to processing component 130. Conduit sections 152 and 153 are coupled together between sections 151 and 154 using couplings 155-

157 that provide secure connections between the sections, even when they are misaligned.

Similarly, because the output of processing component 130 and the input of manifold 121 cannot be precisely positioned, conduit 160 includes multiple sections that are coupled together to allow secure connection of the conduit. Conduit sections 161-164 are coupled together using couplings 165-168. These couplings allow the conduit sections to be securely coupled together despite potentially being misaligned. It should be noted that conduits 150 and 160 may need to have multiple sections in order to allow inclusion of special-purpose conduit sections such as section 164, which includes conduit branches 170 and 171 and corresponding valves.

Figure 2:
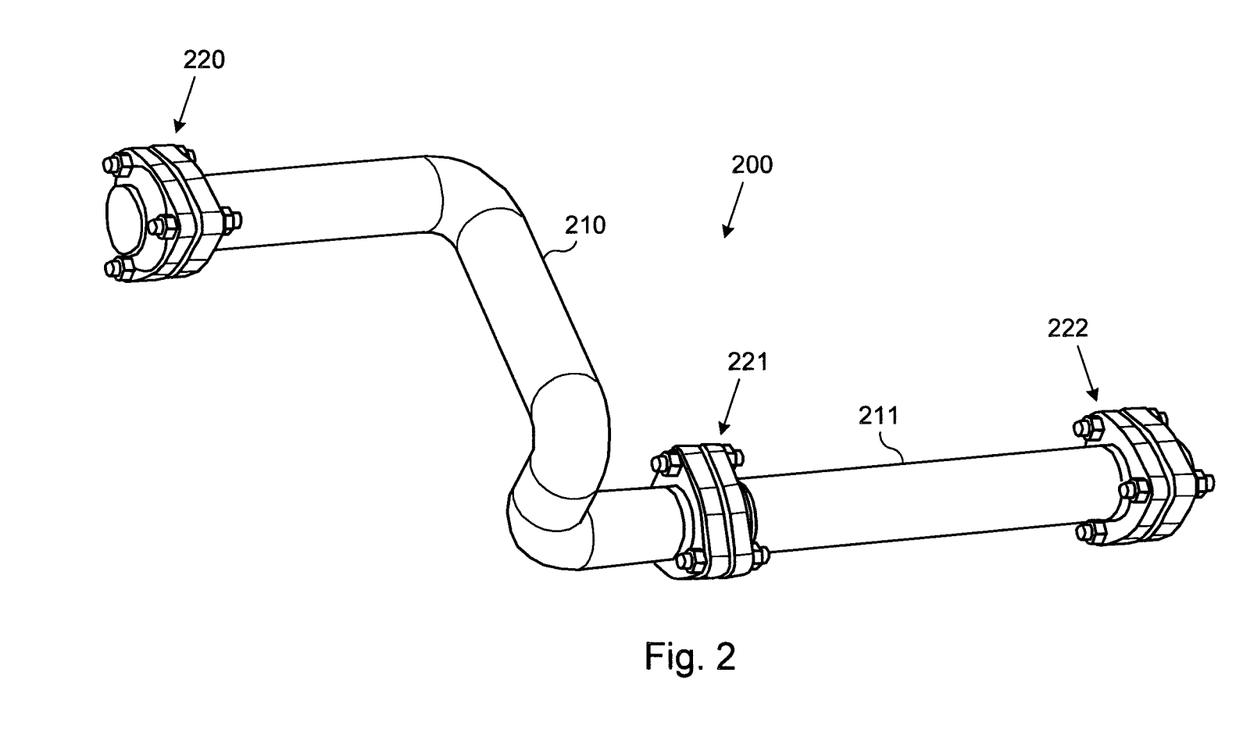
FIG. 2 is a diagram illustrating a multi-section conduit using three-bolt swiveling misalignment connectors in accordance with one embodiment.

Referring to FIG. 2, a multi-section conduit using three-bolt swiveling misalignment connectors in accordance with one embodiment is shown in more detail. In this embodiment, conduit 200 includes two conduit sections (210, 211) and three couplings (220, 221, 222). Coupling 221 allows conduit sections 210 and 211 to be misaligned with respect to each other. Couplings 220 and 222 allow conduit 200 to be misaligned with respect to the components that are interconnected by the conduit. These may, for example, be functional components or additional conduit sections.

Couplings 220-222 are three-bolt swiveling misalignment connectors. As described above, the misalignment feature allows the conduit sections to be securely connected and to have good seals even though the ends of the conduit sections are not precisely aligned with each other. Each coupling uses three bolts, equally spaced around the periphery of the coupling to secure the two flanges of the coupling together. The use of only three bolts allows the coupling to be quickly assembled or disassembled. This is important in systems that include many different conduit sections and that may have to be frequently assembled or disassembled, such as for maintenance purposes. The three-bolt connection also reduces the weight of the coupling in comparison to more conventional couplings that use more bolts and require heavier flanges. The coupling is designed so that at least one of the flanges of the coupling can swivel around the end of the corresponding conduit section. This facilitates alignment of the bolt holes in the two flanges so that the coupling can be quickly and easily assembled.

Figure 3:
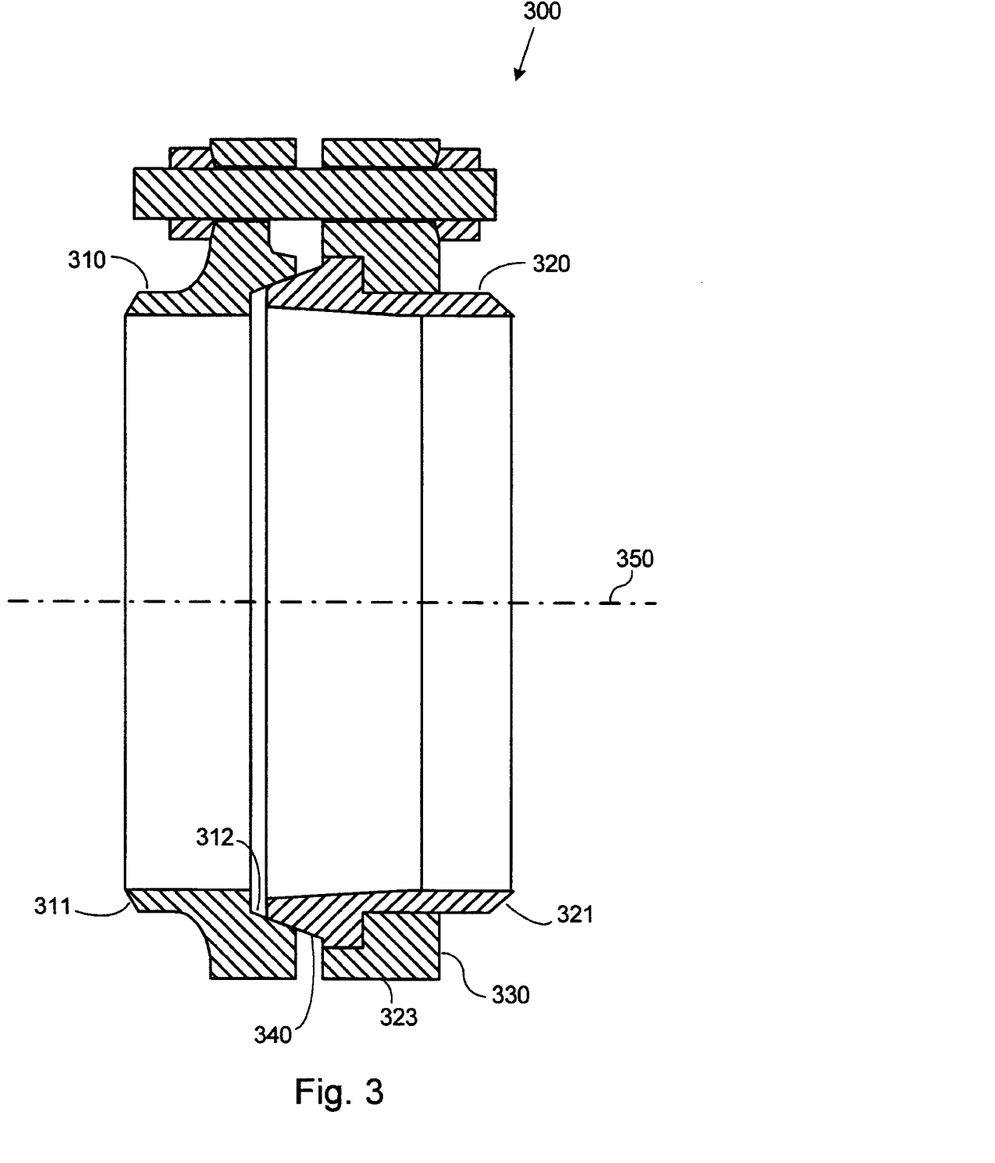
FIG. 3 is a diagram illustrating the structure of a three-bolt swiveling misalignment connector as used in the example of FIG. 2.

Referring to FIG. 3, the structure of a three-bolt swiveling misalignment connector as used in the example of FIG. 2 is shown in more detail. In this example, coupling 300 includes a female coupling member 310, a male coupling member 320 and a swiveling flange or collar 330. Female coupling member 310 is configured so that a rear end 311 of the member can be welded to a first conduit section. Likewise, the rear end 321 of male coupling member 320 is configured to be welded to a second conduit section. Female coupling member 310 has a pocket that is formed by an inward-facing contact surface 312. Male coupling member 320 has a nose formed by outward-facing contact surface 322. The nose of male coupling member 320 fits into the pocket of female coupling member 310. In this embodiment, each of contact surfaces 312 and 322 is spherically shaped so that contact between the surfaces can be maintained when the coupling members are misaligned. A seal ring 340 may be positioned between the contact surfaces in order to ensure a good seal between the flanges. Seal ring 340 may be a simple o-ring, a tapered seal ring (see U.S. Pat. No. 4,452,474), or any other suitable type of seal ring.

Male coupling member 320 has a shoulder 323 which extends radially outward from the member. Collar 330 is positioned around male coupling member 320 so that it abuts a rearward-facing (with respect to the male coupling member) surface of shoulder 323. Collar 330 is then bolted to female coupling member 310, pulling the collar toward the female coupling member and thereby forcing male coupling member 320 toward the female coupling member. The bolts are tightened to apply contact pressure between the contact surfaces of the male and female coupling members (or between these contact surfaces and the corresponding contact surfaces of the seal ring positioned between the contact surfaces). In order to accommodate misalignment of the coupling members, the bolt holes (e.g., 392) may be slightly oversized and both the bolts (e.g., 390) and nuts (e.g., 391) and seats therefor may be slightly rounded.

It should be noted that terminology used herein such as "radial" directions and "inward-facing" and "outward-facing" surfaces should be referenced with respect to the axis 350 at the centerline of the respective component. It should also be noted that, for each of the coupling members, "rear" refers to the end of the coupling member that is configured to be welded or otherwise connected to the corresponding conduit section, while "forward" refers to the end of the coupling member (398, 399) that is farthest from this conduit.

Figure 4A:
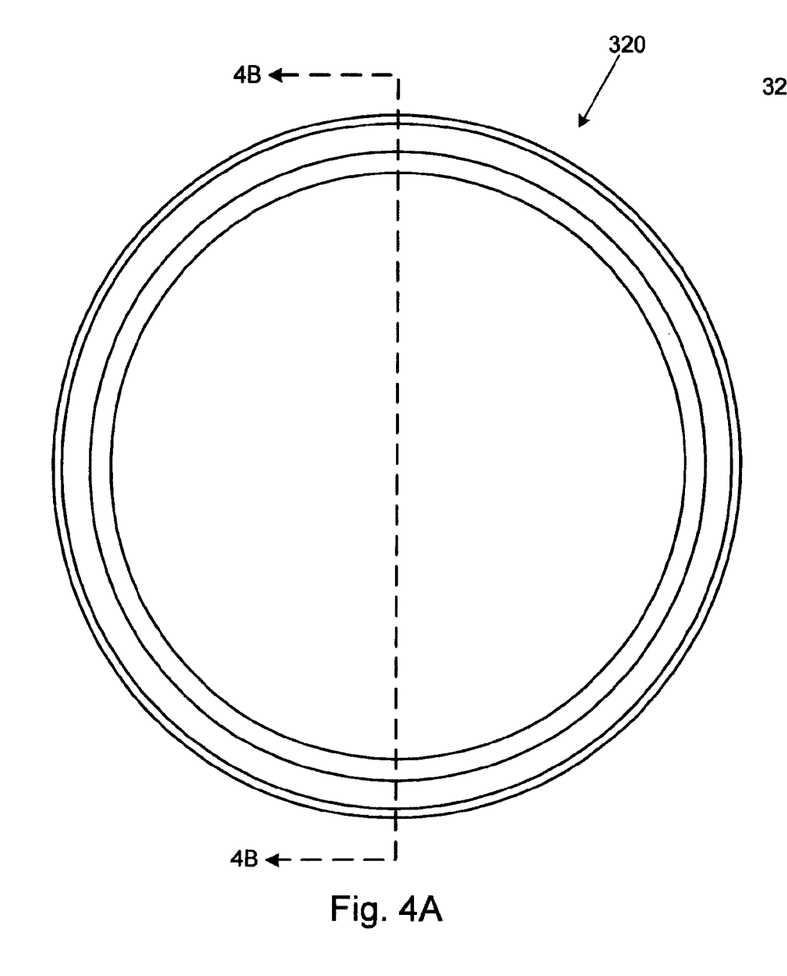
FIGS. 4A and 4B are diagrams illustrating the male coupling member of FIG. 3 separately.
Figure 4B:
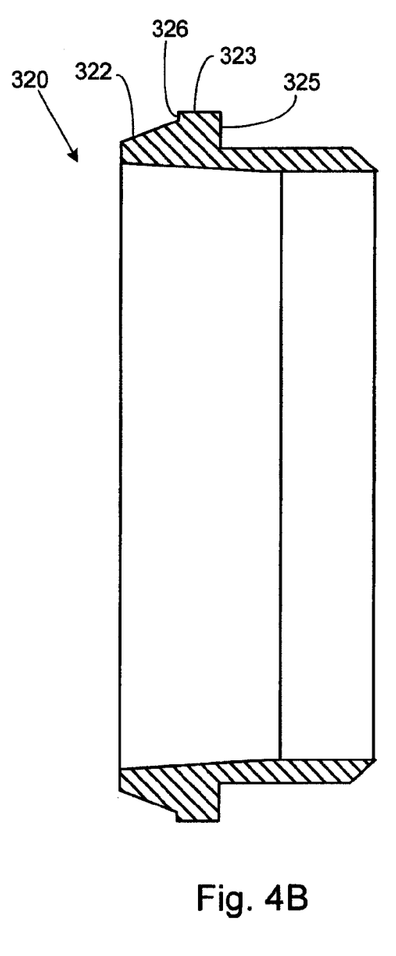

Referring to FIGS. 4A and 4B, male coupling member 320 is shown separately. FIG. 4A is a view of male coupling member 320 along the axis (centerline) of the member. From this view, it can be seen that male coupling member 320 is generally annular in shape and has no protruding tangs around the periphery of the member for bolting it to the female coupling member. FIG. 4B is a cross-sectional view of male coupling member 320 showing the structure of the coupling member. As noted above, an outward-facing contact surface 322 is configured to contact the female coupling member (or a sealing ring between the male and female coupling members) to provide a sealing connection between them. Contact surface 322 is spherical in this embodiment, but may have other shapes in alternative embodiments. In this embodiment, shoulder 323 extends radially outward beyond contact surface 322 to form a stop 326 that limits the axial misalignment between the male and female coupling members. (At approximately 10° in misalignment in this embodiment, the stop contacts the female coupling member and prevents further misalignment.) In addition to forming stop 326, shoulder 323 forms a rear contact surface 325. When collar 330 is positioned around male coupling member 320, the collar contacts surface 325 of the coupling member and applies pressure to this surface to urge the male coupling member into contact with the female coupling member.

Figure 5A:
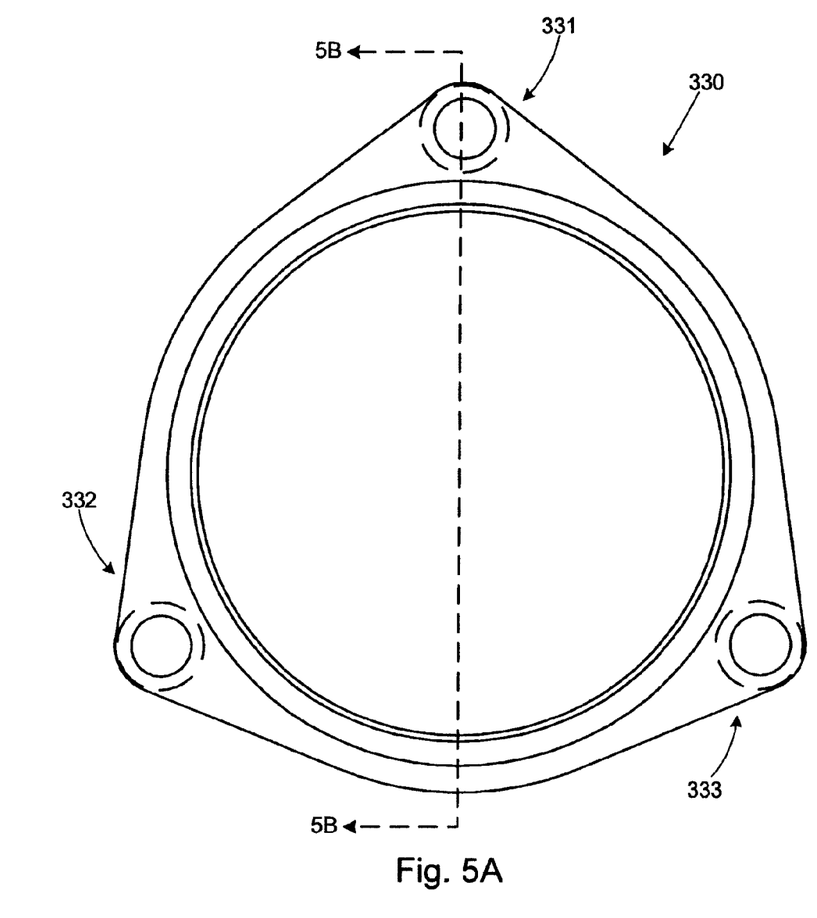
FIGS. 5A and 5B are diagrams illustrating the collar of FIG. 3 separately.
Figure 5B:
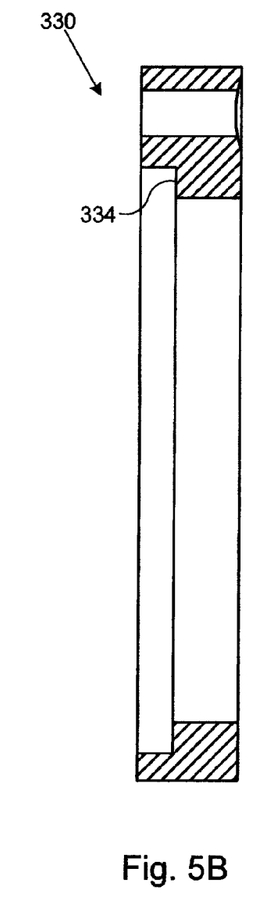

Referring to FIGS. 5A and 5B, collar 330 is shown separately. FIG. 5A is a view of collar 330 along the axis of the collar, while FIG. 5B is a cross-sectional view of the collar. Referring to FIG. 5A, it can be seen that, in contrast to the male coupling member, collar 330 has a flange with three tangs 331-333 extending radially outward, each having a bolt hole therethrough. The tangs enable the collar to be bolted to the female coupling member. Collar 330 includes a contact surface 334 or that comes into contact with rear contact surface 325 of male coupling member 320 and urges the male coupling member into contact with the female coupling member when the coupling is assembled. When the collar is positioned around the male coupling member, the coupling member can rotate or swivel within the collar and is not impeded by the bolts that connect the collar to the female coupling member. The collar can therefore be swiveled and aligned with the bolt holes of the female coupling member without having to move the male coupling member or the conduit section welded to the male coupling member.

Figure 6A:
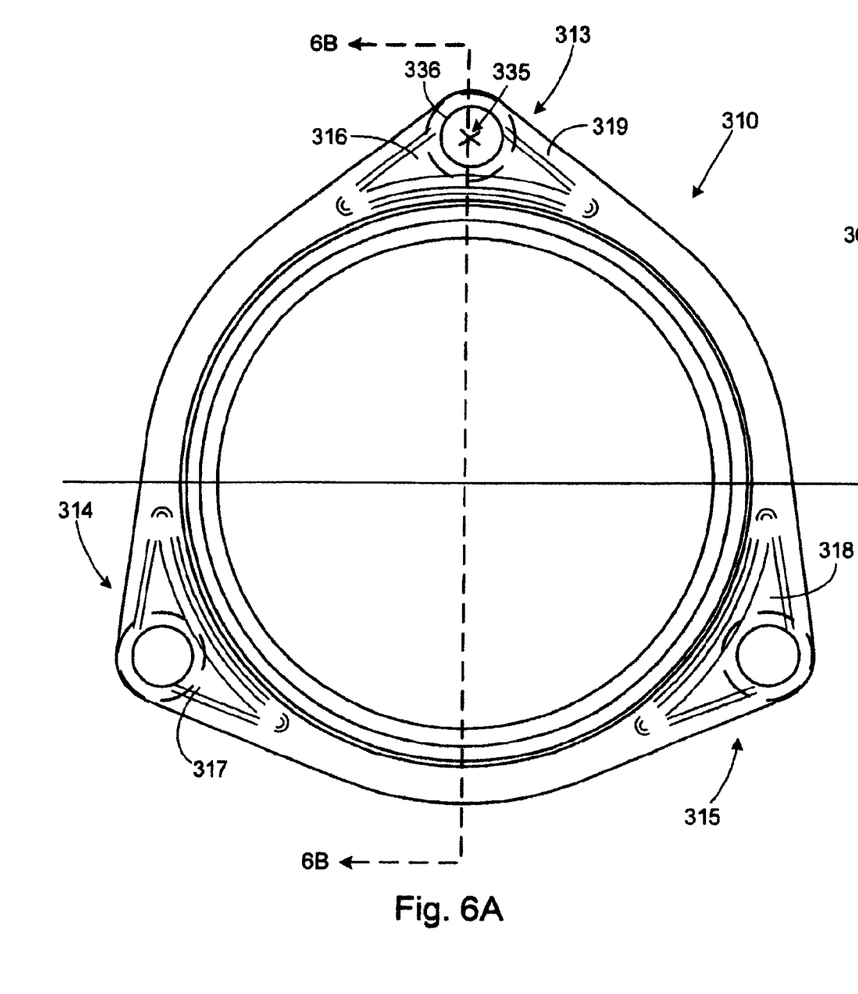
FIGS. 6A and 6B are diagrams illustrating the female coupling member of FIG. 3 separately.
Figure 6B:
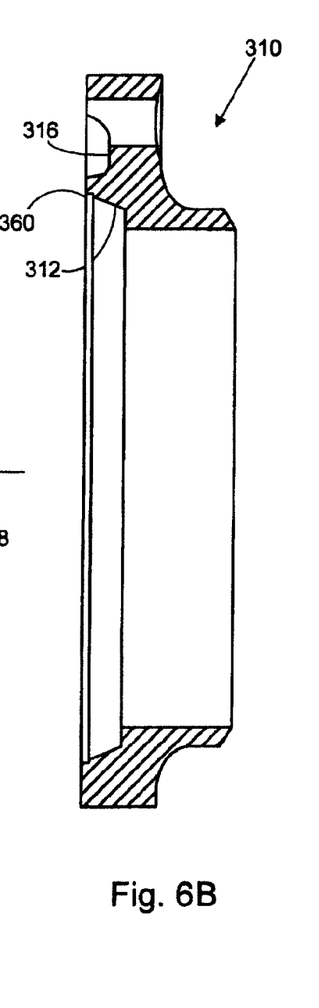

Referring to FIGS. 6A and 6B, female coupling member 310 is shown separately. FIG. 6A is a view of female coupling member 310 along the axis of the coupling member, and FIG. 6B is a cross-sectional view of the female coupling member.

Referring to FIG. 6A, it can be seen that female coupling member 310, like collar 330, has a flange, including three tangs 313-315 extending radially outward from the flange, with both holes therethrough (e.g., bolt hole 336, having center 335). The flange and tangs are stationary with respect to female coupling member 310, in contrast to the flange of collar 330, which swivels around male coupling member 320. The tangs and bolt holes female coupling member 310 are evenly spaced around the periphery of the coupling member so that they can be aligned with the bolt holes of the collar for assembly of the coupling.

Referring to FIG. 6B, female coupling member 310 has an inward-facing contact surface 312 configured to contact the male coupling member and thereby provide a sealing connection between the coupling members. In this embodiment, there is a recess in contact surface 312 in which a sealing ring 360 can be seated to provide a good seal between contact surface 312 of the female coupling member and contact surface 322 of the male coupling member.

FIGS. 6A and 6B also show that each tang (313, 314, 315) of female coupling member 310 has a generally triangular-shaped recess (316, 317, 318) therein. In a conventional coupling, the flange is larger and accommodates more bolts (e.g., typically at least six) positioned around the periphery of the flange. The greater number of bolts are used not simply to provide sufficient contact pressure between the contact surfaces of the coupling components, but also to the evenly distribute the contact pressure around the peripheries of components.

Because only three bolts are used in this embodiment, there could be an uneven distribution of contact pressure around the contact surfaces of the coupling member if the thickness of the flange were the same across the entirety of each tang. In other words, the bolts could apply pressure at the three tangs, causing inward deformation of the female contact surface 312 near the tangs so that this contact surface does not meet the tolerances required for a good seal. The coupling could therefore leak. By providing the triangular recesses between the tangs and the contact surface, the tangs are allowed to flex somewhat without deforming the contact surface inward at those points. The greater thickness around the outer edge of the flange (e.g., at tangential portion 319) or helps to transfer contact pressure to points between the tangs. Recesses 316-318 thereby reduce stresses and resulting deformation of the female contact surface and improve the seal produced by the coupling.

It should be noted that it is not necessary in this embodiment to provide recesses in the tangs of collar 330 because deformation of the collar that may be caused by the tightening of the bolts in the assembled coupling may affect contact between the collar and the shoulder of male flange 320, but little, if any, of this deformation is transferred to contact surface 322 of the male flange.

It is contemplated that various embodiments of the present coupling are suitable for high-pressure conduits (e.g., conduits that must be pressurized to over 200 psi). Some embodiments of the coupling may withstand internal pressures of over 1000 psi. The high-pressure performance of the present coupling is therefore comparable to conventional high-pressure couplings. Both of these types of couplings are typically forged and/or machined, in contrast to the type of stamped-metal fixtures used in common low-pressure plumbing applications. The present coupling may be employed in a variety of applications ranging from smaller diameter pipes (e.g., 3 inch diameter) to larger pipelines (over 10 inches in diameter), similar to larger high-pressure pipe flanges. As noted above, however, the present coupling provides the advantage of easy assembly because the coupling is lighter, has fewer bolts than conventional couplings, and swivels. Further, the coupling allows connections of conduits in applications in which tight positioning and alignment tolerances may not be met using conventional couplings.

It should be noted that, while the foregoing description focuses on an exemplary embodiment that uses bolts to fasten the flange of the female coupling member to the flange of the swiveling collar, alternative embodiments may employ other types of fasteners. For instance, rather than providing bolt holes at the attachment points (tangs) of the flanges, the attachment points may be configured to be fastened together by clamps. Still other fasteners may also be used.

It should be noted that references herein to conduits and pipes should be construed interchangeably, and should further be construed to include types of conduits that are not simple tubular members. For example, manifolds, valve bodies and other components through which fluid may flow are considered to be conduits or pipes for the purposes of this disclosure.

The benefits and advantages which may be provided by the present invention have been described above with regard to specific embodiments. These benefits and advantages, and any elements or limitations that may cause them to occur or to become more pronounced are not to be construed as critical, required, or essential features of any or all of the claims. As used herein, the terms "comprises," "comprising," or any other variations thereof, are intended to be interpreted as non-exclusively including the elements or limitations which follow those terms. Accordingly, a system, method, or other embodiment that comprises a set of elements is not limited to only those elements, and may include other elements not expressly listed or inherent to the claimed embodiment.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein and recited within the following claims.

What is claimed is:

1. A swivel misalignment coupling for connecting conduit sections comprising:
 a female coupling member having an aperture therethrough, wherein the female coupling member includes
  a first rearward end which is configured to be connected to a first conduit section,
  a first forward end which has a female pocket including a first contact surface, and
  a stationary flange at the periphery of the female coupling member, wherein the flange includes a circular portion and a plurality of triangular tangs protruding from the circular portion, wherein each tang has an attachment point and a triangular recess directly between a center of the attachment point and a longitudinal axis of the female coupling member, wherein the triangular recess is positioned on a side of the stationary flange which includes the first contact surface, forms a portion of the attachment point, and extends to a depth which is less than a thickness of the attachment point;

a male coupling member having an aperture therethrough, wherein the male coupling member includes
 a second rearward end which is configured to be connected to a second conduit section, and
 a second forward end which has a male nose including a second contact surface that mates with the first contact surface of the female coupling member;

a swiveling collar member
 wherein the swiveling collar member is positioned around the male coupling member and to swivel around the male coupling member,
 wherein the swiveling collar member has no more than three attachment points and wherein each of the attachment points of the swiveling collar member is positioned to be secured to a corresponding one of the attachment points of the stationary flange, and
 wherein the swiveling collar member abuts a rearward-facing surface of the male coupling member; and one or more fasteners, wherein each of the fasteners secures one of the attachment points of the swiveling collar member to the corresponding one of the attachment points of the stationary flange, thereby securing the swiveling collar member to the stationary flange and holding the first contact surface of the female coupling member against the second contact surface of the male coupling member.

2. The coupling of claim 1, wherein the first contact surface comprises a concave spherical contact surface and wherein the second contact surface comprises a convex spherical contact surface.

3. The coupling of claim 1, wherein each of the attachment points includes a bolt hole having a recessed seat, and wherein each of the fasteners comprises a threaded bolt which is inserted through one of the bolt holes of the swiveling collar member and one of the bolt holes of the stationary flange and a corresponding threaded nut which is threaded onto the bolt, thereby securing the corresponding attachment points of the swiveling collar member and the stationary flange to each other.

4. The coupling of claim 1, wherein for each attachment point, the recess allows the attachment point to flex with respect to the first contact surface without substantially deforming the first contact surface.

5. The coupling of claim 1, wherein for each attachment point, the recess is positioned on the side of the stationary flange which includes the first contact surface and faces the swiveling collar member.

6. The coupling of claim 1, wherein each of the attachment points includes a bolt hole, wherein the bolt hole has a recessed seat on the opposite side of the stationary flange from the triangular recess, and wherein each of the fasteners comprises a threaded bolt which is inserted through one of the bolt holes of the swiveling collar member and one of the bolt holes of the stationary flange and a corresponding threaded nut which is threaded onto the bolt, thereby securing the corresponding attachment points of the swiveling collar member and the stationary flange to each other.

7. The coupling of claim 1, wherein the stationary flange further comprises a tangential portion at an outer edge of the stationary flange, wherein a thickness of the stationary flange is greater at the tangential portion than at the triangular recess, and wherein the tangential portion transfers contact pressure from the attachment points to portions of the stationary flange between the tangs.

8. The coupling of claim 1, wherein the triangular recess is centered on a line from center of the attachment point to the centerline of the female coupling member.

9. The coupling of claim 1, wherein the male coupling member includes a shoulder that extends radially outward from the male coupling member, wherein the shoulder forms a stop that limits the misalignment of the male coupling member with the female coupling member.

10. The coupling of claim 1, wherein the swiveling collar member is in contact with the rearward-facing surface of the male coupling member.

11. A position-adjustable conduit comprising:
 a plurality of conduit sections; and
 a plurality of couplings;
 wherein each of the conduit sections is coupled to another one of the conduit sections by one of the couplings, and wherein each of the couplings includes
  a female coupling member having an aperture therethrough, wherein the female coupling member is connected to a first one of the conduit sections and has a forward end which has a female pocket including a first contact surface and has a stationary flange at the periphery of the female coupling member, wherein the flange includes a circular portion and a plurality of triangular tangs protruding from the circular portion, wherein each tang has an attachment point and a triangular recess directly between a center of the attachment point and a longitudinal axis of the female coupling member, wherein the triangular recess is positioned on a side of the stationary flange which includes the first contact surface, forms a portion of the attachment point, and extends to a depth which is less than a thickness of the attachment point;
  a male coupling member having an aperture therethrough, wherein the male coupling member is connected to a second one of the conduit sections and has a forward end which has a male nose including a second contact surface that mates with the first contact surface of the female coupling member,
  a swiveling collar member which is positioned around the male coupling member, to abut a rearward-facing surface of the male coupling member and to swivel around the male coupling member, wherein the swiveling collar member has no more than three attachment points and wherein each of the attachment points of the swiveling collar member is positioned to be secured to a corresponding one of the attachment points of the stationary flange, and
  one or more fasteners, wherein each of the fasteners secures one of the attachment points of the swiveling collar member to the corresponding one of the attachment points of the stationary flange, thereby securing the swiveling collar member to the stationary flange and holding the first contact surface of the female coupling member against the second contact surface of the male coupling member.

12. The position-adjustable conduit of claim 11, wherein the first contact surface comprises a concave spherical contact surface.

13. The position-adjustable conduit of claim 11, wherein the second contact surface comprises a convex spherical contact surface.

14. The position-adjustable conduit of claim 11, wherein each of the attachment points includes a bolt hole and wherein each of the fasteners comprises a threaded bolt which is inserted through one of the bolt holes of the swiveling collar member and one of the bolt holes of the stationary flange and a corresponding threaded nut which is threaded onto the bolt, thereby securing the corresponding attachment points of the swiveling collar member and the stationary flange to each other.

15. The position-adjustable conduit of claim 11, wherein for each attachment point, the recess allows the attachment point to flex with respect to the first contact surface without substantially deforming the first contact surface.

16. The position-adjustable conduit of claim 11, wherein for each attachment point, the recess is positioned on the side of the stationary flange which includes the first contact surface and faces the swiveling collar member.

17. The position-adjustable conduit of claim 11, wherein the male coupling member includes a shoulder that extends radially outward from the male coupling member, wherein the shoulder forms a stop that limits the misalignment of the male coupling member with the female coupling member.

18. The position-adjustable conduit of claim 11, wherein the swiveling collar member is in contact with the rearward-facing surface of the male coupling member.

* * * * *